United States Patent [19]
Feuerlein et al.

[11] Patent Number: 5,126,724
[45] Date of Patent: Jun. 30, 1992

[54] DATA PROCESSING DEVICE WITH AN OPERATING PANEL

[75] Inventors: Friedrich Feuerlein; Helmut Müller, both of Nuremberg, Fed. Rep. of Germany

[73] Assignee: Asea Brown Boveri Aktiengesellschaft, Mannheim, Fed. Rep. of Germany

[21] Appl. No.: 433,676

[22] Filed: Nov. 7, 1989

[30] Foreign Application Priority Data

Nov. 12, 1988 [DE] Fed. Rep. of Germany ....... 3838401

[51] Int. Cl.⁵ ............................................. G09G 3/02
[52] U.S. Cl. ................... 340/711; 340/706; 248/918
[58] Field of Search .................. 340/711, 706; 341/20, 341/22; 248/918; 364/209.12; 273/148 B; 358/194.1

[56] References Cited

U.S. PATENT DOCUMENTS

| | | | |
|---|---|---|---|
| 4,278,997 | 7/1981 | Folz | 358/194.1 |
| 4,692,740 | 9/1987 | Washizuka et al. | 341/22 |
| 4,758,923 | 7/1988 | Tanaka et al. | 361/331 |
| 4,773,032 | 9/1988 | Uehara et al. | 364/709.12 |
| 4,794,381 | 12/1988 | Iwai . | |
| 4,853,838 | 8/1989 | Westermann | 340/711 |

FOREIGN PATENT DOCUMENTS

| | | |
|---|---|---|
| 2847798 | 5/1980 | Fed. Rep. of Germany . |
| 3612640 | 10/1986 | Fed. Rep. of Germany . |
| 3520272 | 12/1986 | Fed. Rep. of Germany . |
| 3544243 | 6/1987 | Fed. Rep. of Germany . |
| 8705987 | 7/1987 | Fed. Rep. of Germany . |
| 3621260 | 1/1988 | Fed. Rep. of Germany . |
| 3624654 | 1/1988 | Fed. Rep. of Germany . |
| 0210778 | 11/1984 | Japan ................................ 358/194.1 |

Primary Examiner—Alvin E. Oberley
Assistant Examiner—Matthew Luu
Attorney, Agent, or Firm—Herbert L. Lerner; Laurence A. Greenberg

[57] ABSTRACT

In data processing devices for built-in control panels having a vertical front surface, the disposition of the operating panel is particularly ergonomically unsatisfactory when the operating panel is located substantially below the height of the head of the operator. The operating module therefore can be inserted into a front compartment disposed at the front surface of the device. A correspondingly constructed suspension configuration is provided in the front compartment for suspending the operating module in two different positions with respect to the front surface of the device. The invention can be used for facilitating operation of all data processing devices with a vertical front surface.

16 Claims, 4 Drawing Sheets

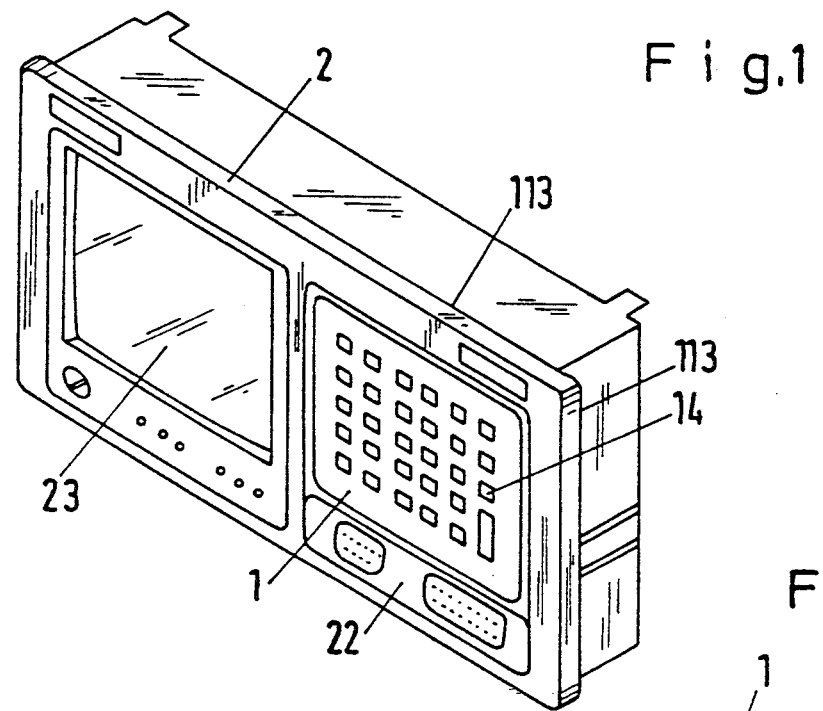
Fig.1
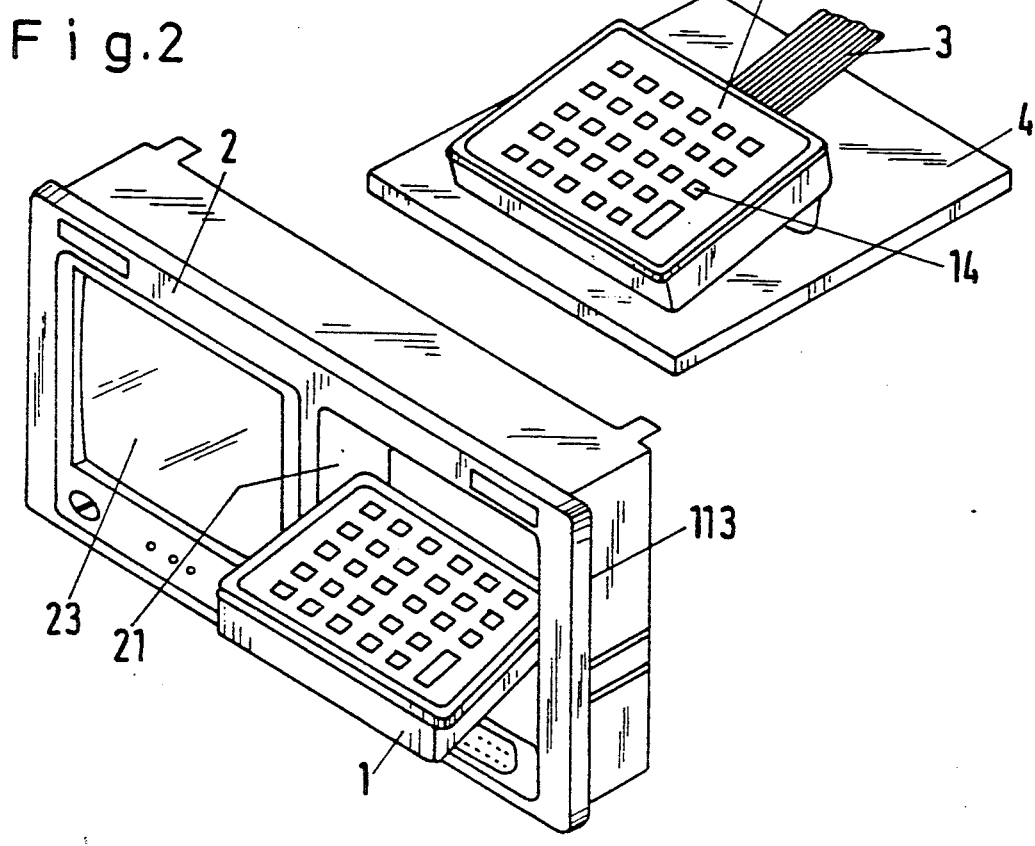
Fig.3
Fig.2

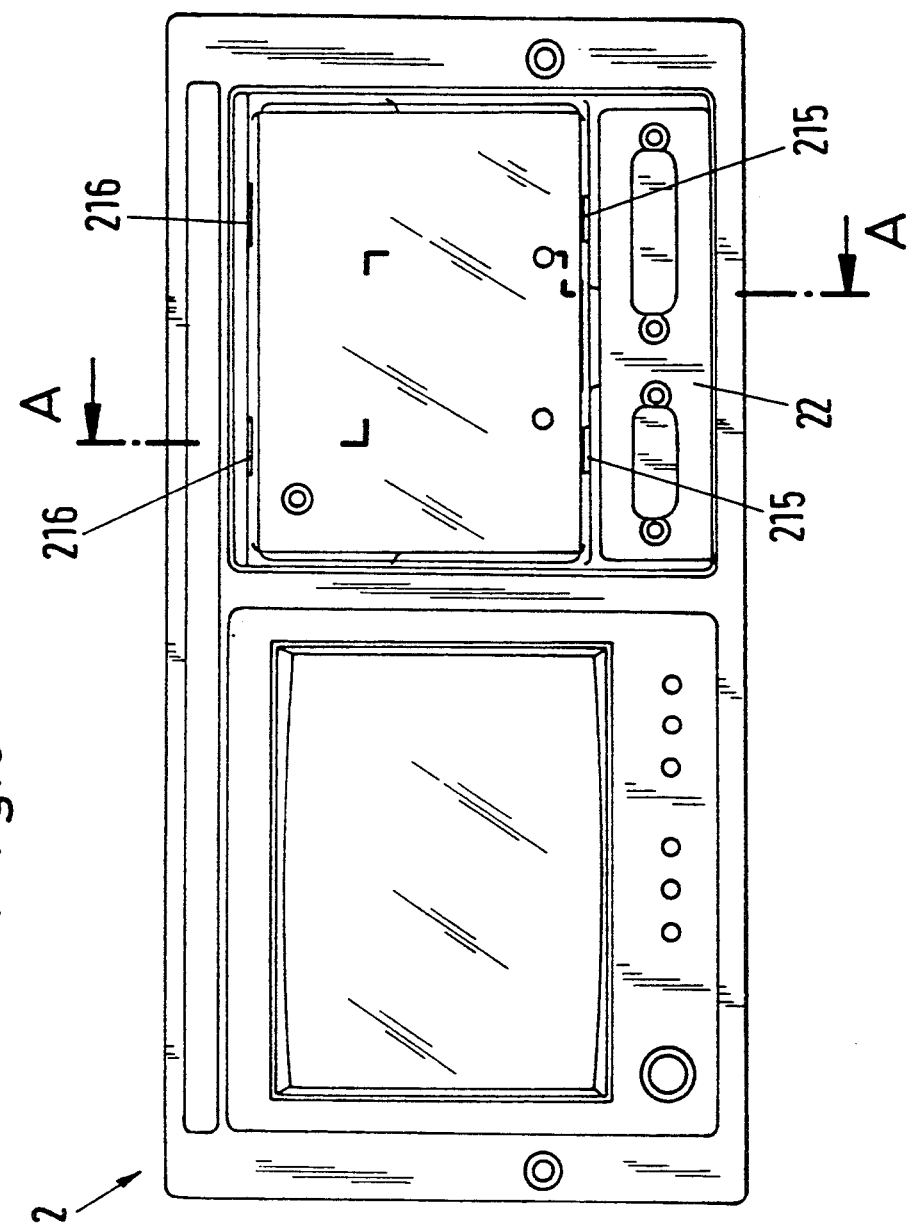
Fig. 5
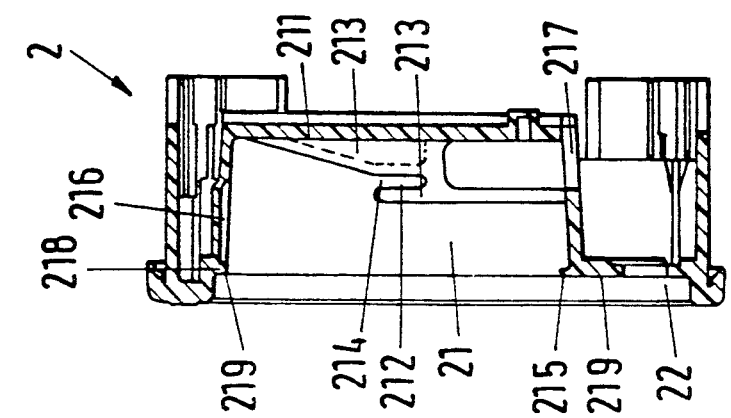
Fig. 4 (A-A)

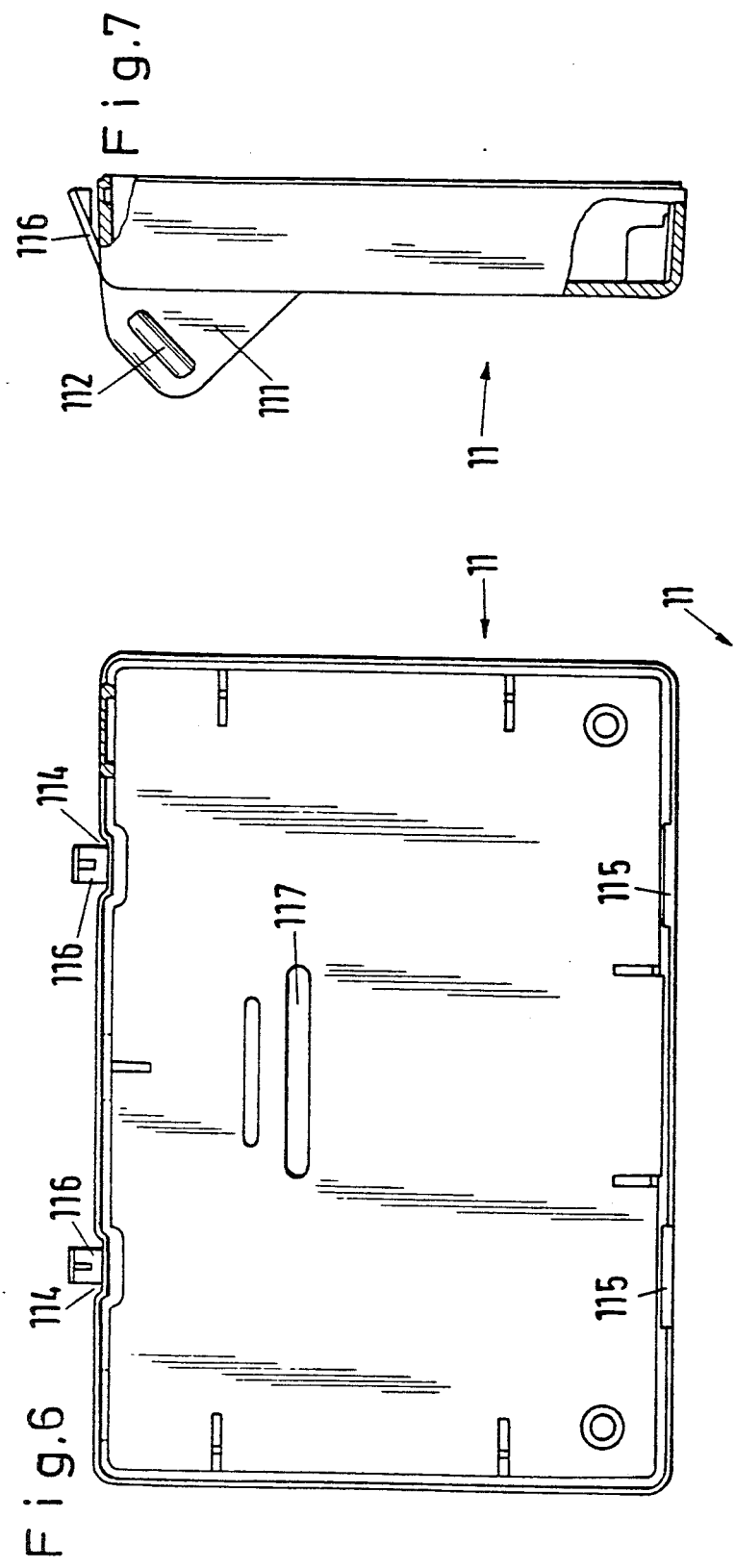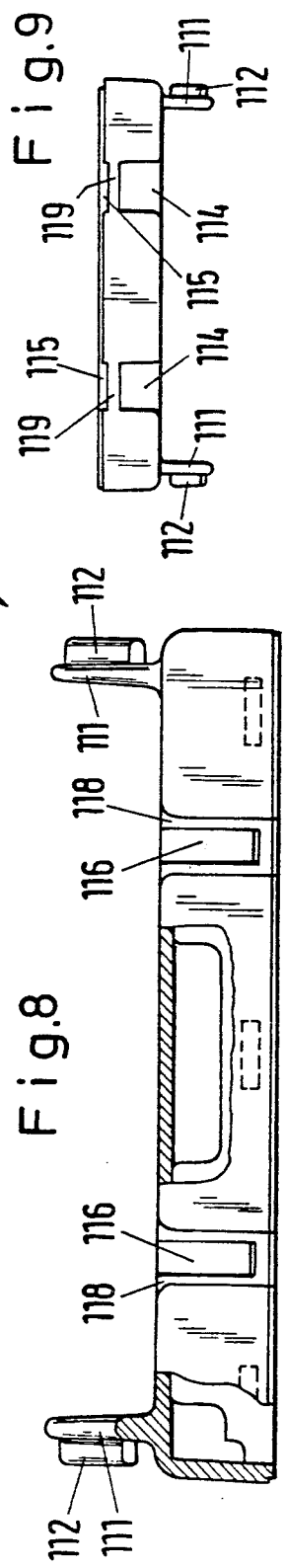

DATA PROCESSING DEVICE WITH AN OPERATING PANEL

The invention relates to a data processing device having a substantially vertical front surface, which is preferably constructed as a built-in control panel unit and has at least one operating panel and one display panel, the operating panel including an operating module having a module housing with operating keys to be inserted in the front surface of the data processing device.

As a rule, data processing devices have an operating panel equipped with keys in order to receive input instructions. With conventional data terminals, as they are used in the administrative sector, particular value is attached to an ergonomic configuration of the operating panel.

However, as a result of microprocessor technology, electronic data processing is increasingly being used in the widest variety of technological areas. In this connection, the devices employed must be adapted to the standard which is applicable in the respective sector. Thus control panel units are characterized by a vertical front surface having operating elements which are usually only in an ergonomically favorably position to some extent when the device is approximately at the height of the head of the operator, since only then is it not necessary for the operator to bend over or stretch.

Although it is known to separate the operating panel of the data processing device from the device and to accommodate it in an operating module connected to the device through a line, there is often no table in the vicinity of control panels on which the operating module could be placed. In the case of measuring devices, as a rule it is also only necessary to enter data from time to time, so that it would be a nuisance if an operating module were nevertheless continually in the way.

It is accordingly an object of the invention to provide a data processing device with an operating panel, which overcomes the hereinafore-mentioned disadvantages of the heretofore-known devices of this general type and to do so in such a way as to facilitate the operation of even such devices which are disposed far below head height in a control panel or a 19-inch rack.

With the foregoing and other objects in view there is provided, in accordance with the invention, a data processing device, comprising a device housing having an interior and a substantially vertical front surface, preferably constructed as a built-in control panel unit, with a display panel, said front surface having a front compartment formed therein along side said display panel being open to the outside and separated from the interior of said device housing, at least one operating panel having an operating module with a module housing to be inserted in said front compartment, said module housing having operating keys, said front compartment having a suspension configuration, said operating module having retaining elements for engaging said suspension configuration and permitting manual movement of said operating module without tools into at least three different positions, said operating module assuming different angular positions relative to said front surface in at least two of said positions and said operating module being able to be placed on a horizontal table surface separate from said device housing in a further one of said positions, and a connecting cable, preferably a multi-wire ribbon cable, electrically and fully functionally connecting said operating module and said device housing in all of said positions.

By virtue of the particular construction and variable configuration of the operating module within the data processing device it is possible to move the operating module into a position which facilitates access for the operator. It is, of course, much easier to operate a data processing device disposed in the lower region of a control panel if the operating module is moved out of its basic position into a tilted position in which the operating elements are not only easier to recognize, but also are more readily accessible.

Moreover, the retaining elements of the operating module and the suspension configuration provided in the front compartment of the device are constructed in such a way that the operating module can be lifted out without tools and taken out of the front compartment. In this configuration it remains connected to the device through a multi-wire ribbon cable and can be held in the hand during data input or placed on a horizontal surface. A particular advantage of this configuration is that the operating module can return again to its place in the front compartment after input and is thus no longer in the way.

As long as the operating module is located in or on the device, it is sufficient if it can take up two different positions. In the first position, which is termed the basic position, the operating module lies parallel to the plane of the front surface of the data processing device. In the second position, the operating module forms an angle of more than 90 towards the top with the front surface of the device, which means that the top part of the operating module is swung into the front compartment and its bottom part is swung out of the front compartment.

For aesthetic reasons, as well as for protecting the operating keys, it is advantageous for the operating keys not to protrude over the front surface of the data processing device, but rather to end on a plane with the front surface, when the operating module is in a vertical position. The operating plane on which the operating keys are disposed is correspondingly recessed slightly with respect to the front surface of the data processing device.

In order to accommodate the connecting cable, it is advantageous to provide an intermediate space between the rear surface of the operating module and the base of the front compartment, and to construct the ribbon cable which can be folded over in several layers in such a way that it is accommodated in the intermediate space.

According to an advantageous refinement of the subject-matter of the invention, the module housing is equipped with locating elements which cooperate with corresponding receiving elements formed in the front compartment. When the operating module is inserted into the front compartment, the locating elements lock, but can be released again for removal by raising the operating module. Furthermore, a retaining flange is provided which rests along with the module housing on the edge of the front compartment on two opposite sides at the top and bottom. The retaining flange projects toward the bottom into a depression which permits access for removing the operating module.

The locating elements provided on the module housing include notches which follow the retaining flange on the lower surface of the module housing. Retaining dogs formed in the front compartment can become engaged into the notches. Furthermore, the locating elements include spring lugs which are disposed on the upper surface of the module housing and which latch into corresponding cutouts in the front compartment. The spring lugs are advantageously constructed in such a way that they extend on the upper surface of the module housing, from the rear wall of the module housing in the direction toward the retaining flange and they protrude slightly towards the free ends thereof. This construction ensures that when the operating module is inserted into the front compartment, the spring lugs will be pressed towards the module housing and the free ends thereof will lock on the ridge of a cutout provided for this purpose.

It is possible to change the position of the operating module by virtue of the fact that in each case one supporting bracket is formed on either side at the top end of the rear surface of the module housing, at right angles to the rear surface. The outer surfaces of the supporting brackets are equipped with slide dogs which in turn engage in retaining slots that are formed on the right and left sides in the inner walls of the front compartment. A stable position of the operating module is achieved by means of the slide dogs of corresponding length engaging in the retaining slot.

The retaining slot is advantageously defined by a rail-like slot guide and opens towards the top through a slot entry. In this configuration, the slot entry is preferably constructed in such a way that a rail-like rear part of the slot guide projects beyond its front part so that when the operating module is inserted, the slide dog can rest against the rear part.

In order to be able to lead the connecting cable out of the module housing, a lead-through opening is provided on the rear surface thereof, from which the connecting cable is led to a further opening formed in the front compartment. The cable is preferably connected to a circuit board of the device by means of a plug connector.

The front surface of the device with the front compartment is advantageously formed by a front frame part which encloses the front compartment as well as an adjacent window behind which a display for displaying data is disposed.

Other features which are considered as characteristic for the invention are set forth in the appended claims.

Although the invention is illustrated and described herein as embodied in a data processing device with an operating panel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic perspective view of the front frame part of a data processing device with vertically disposed operating module;

FIG. 2 is a view similar to FIG. 1 with a tilted operating module;

FIG. 3 is a fragmentary, perspective view of an operating module removed from the front compartment and placed on a horizontal surface;

FIG. 4 is a longitudinal-sectional view of the front frame part with the front compartment taken along the line A—A of FIG. 5, in the direction of the arrows;

FIG. 5 is a front-elevational view of the front frame part;

FIG. 6 is a top-plan view of the module housing showing the interior thereof;

FIG. 7 is a side-elevational view of the narrow side of the module housing;

FIG. 8 is a side-elevational view of a wide side of the module housing;

FIG. 9 is a side-elevational view of the wide side of the module housing opposite the side shown in FIG. 8;

Figure 11:
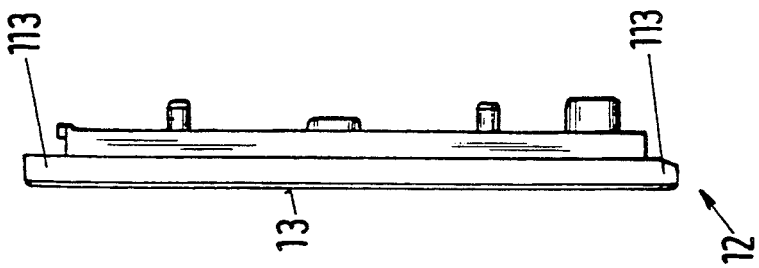
FIG. 11 is a side-elevational view of the narrow side of the operating panel.

Referring now to the figures of the drawings in detail, there is seen a data processing device to be described below, that is an electronic recorder in which the data forming a curve are continuously stored and indicated on a display. As can be seen from FIGS. 1 and 2, the device has a device housing with a front surface in a front plane and a front frame part 2 with a display panel having a window 23 and a front compartment 21 in which an operating panel with an operating module 1 is disposed in such a way as to be tiltable. Thus according to FIG. 1 operating keys 14 lie vertically above one another, while in FIG. 2 the operating module assumes a position that is tilted with respect to the horizontal. In the FIG. 2 position, the bottom part of the operating module projects out from the front compartment, while its upper part projects into the front compartment, but only so far that no hindrance to access arises.

FIG. 3 shows a further position variant in which the operating module 1 is removed from the front compartment 21 and placed on a horizontal table surface. The operating module 1 remains electrically connected to the device through a connecting cable 3. Securing elements provided for securing the operating module 1 in the front compartment 21 of the front frame part 2 can be seen in FIGS. 4 and 5. It is expedient to include the associated securing elements assigned to a module housing 11 and illustrated in FIGS. 6 to 9 in this discussion. In this case, it should be taken into account that separate securing elements are required for the two positions to be provided for the operating module 1.

In order to utilize space in the best possible way, the front compartment 21 is constructed in such a way as to be only so deep that sufficient space for the folded-over ribbon cable 3 remains between the operating module and a rear wall 211 of the front compartment 21, in the case of the vertical position of the operating module 1. This depth, however, does not suffice for swivelling the operating module for example about a centrally disposed axis. Moreover, the inwardly tilted upper part of the operating module 1 must not be too deeply submerged so that access to the operating keys 14 is not hindered by the front frame part 2. A swivel axis has therefore been omitted. Instead, the position of the operating module 1 is changed by means of elements permitting a different suspension.

In order to provide the vertical positioning of the operating module 1, locating elements formed of two spring lugs 116 formed on the upper surface as well as notches 115 formed in the lower surface of the module 1, are provided. Associated therewith are corresponding cutouts 216 formed in the front compartment 21 into which the spring lugs 116 can lock behind a locating ridge, as well as retaining dogs 215 which in turn are held in the notches 115.

The spring lugs 116 lie in a recess 118 and are formed on the rear wall of the module housing 11 in such a way that they extend toward the front surface of the operating module 1, protrude slightly from the housing, and form an acute angle with the upper surface of the housing. The recesses 118 are dimensioned in such a way that they permit submersion of the spring lug 116 when the operating module 1 is inserted. However, as soon as the spring lugs 116 have overcome locating ridges 218 on the upper surface of the front compartment 21, they are accommodated in the cutout 216 and can thus be anchored with their free end behind the locating ridge 218.

The notches 115 in the lower surface of the module housing 11 lie in a push-in direction, that is behind a guide slot 114 as seen from the rear surface of the operating module 1. The latter has an inclined guide surface, which rises up to the level of a separating web 119 that separates the guide slot from the notch 115. When the operating module 1 is inserted, the retaining dogs formed on the front compartment 21 can thus slide from the guide slot 114 over the separating web 119 and be anchored in the notches 115. The anchoring is supported by gravity on one hand and by the spring lugs 116 on the other hand.

When the operating module 1 is inserted, the module housing 11 lies along with a retaining flange 113 against the front frame part 2. In order to ensure that the operating module 1 does not protrude beyond the front plane of the device, bearing surfaces 219 are provided behind the front plane in the vicinity of the front compartment at the top and bottom. The retaining flange 113 is held on the bearing surfaces 219. The bearing surface 219 extends downwards into a depression 22, which permits access to the retaining flange 113. By virtue of the recess 22, the operating module 1 can be gripped on its lower surface and raised for removal, as a result of which the retaining dogs 215 slide out of the notch 115 over the separating web 119 towards the outside. Due to the resulting tilting of the operating module 1, the spring lugs 116 are released from their anchoring and the operating module 1 can be removed, in order to move it into another position or place it on a table.

Figure 10:
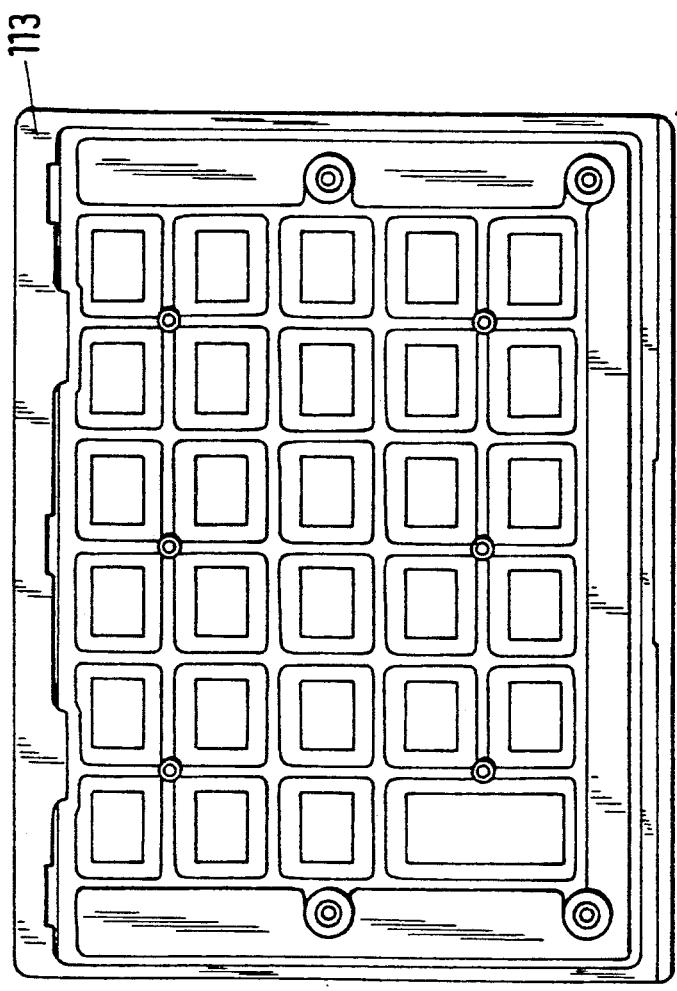
FIG. 10 is a bottom-plan view of the operating panel.
Figure 12:
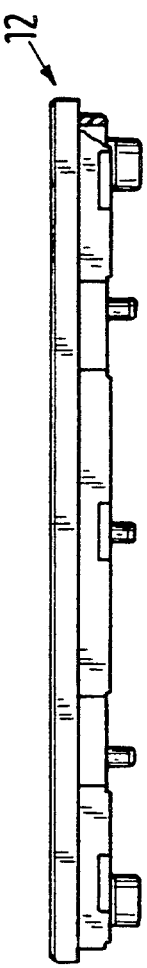
FIG. 12 is a side-elevational view of the long side of the operating panel.

As FIGS. 10 to 12 illustrate, the retaining flange 113 is formed of an operating panel 12 covering the module housing 11 towards the front surface. As seen in the vertical position, the panel projects at the top and bottom over the edge of the module housing 11. The further construction of the operating panel 12 provided for receiving the operating keys 14 is not significant for the invention and is thus not described.

The retaining elements provided for the second position of the operating module 1 are formed of two supporting brackets 111 formed on the top end of the rear surface of the sides of the operating module 1 in ear-like fashion. Each of the supporting brackets 111 are provided with a slide dog 12 which engages in a retaining slot 212 provided laterally in the front compartment 21. The retaining slot 212 is formed on both side walls of the front compartment 21 by two slot guides 213 having front parts and rail-like rear parts which enclose it, and the vertically extending retaining slot 212 is open toward the top with a slot entry 214. The rear slot guide projects over the front one and approaches the compartment base or rear wall 211 of the front compartment 21 in the form of a funnel.

Since no flange is provided laterally, when the operating module 1 is inserted, the latter can be submerged into the front compartment 21 until the slide dogs 112 meet the rear slot guide for a wall 13 in an operating plane. The slide dogs 112 extending at an angle of approximately 45 relative to the rear surface of the operating module 1 can slide into the retaining slot 212 and stop at its end, provided that the operating module 1 is held at an angle of 45 relative to the front surface of the device.

By virtue of an appropriate length of the slide dogs 112, the operating module 1 is prevented from bending so that the predetermined position is maintained against gravity. The supporting brackets 111 formed on the rear wall of the module housing 11 have the essential advantage that they hold the operating module in an ergonomically favorable tilted position even when it has been removed from the front compartment 21 and placed on a table surface.

In order to provide the electrical connection of the operating module 1 with a circuit board of the device, which preferably has a plug connector, a lead-through opening 117 is provided in the module housing 11 and an opening 217 is provided in the front compartment 21, the dimensions of both of which are matched to the connecting cable 3 which is formed as a ribbon cable.

We claim:

1. Data processing device, comprising a device housing having an interior and a substantially vertical front surface with a display panel, said front surface having a front compartment formed therein along side said display panel being open to the outside and separated from the interior of said device housing, at least one operating panel having an operating module with a module housing to be inserted in said front compartment, said module housing having operating keys, said front compartment having a suspension configuration, said operating module having retaining elements for engaging said suspension configuration and permitting manual movement of said operating module without tools into at least three different positions, said operating module remaining engaged by said suspension configuration and assuming different angular positions relative to said front surface in at least two of said positions and said operating module being able to be placed on a substantially horizontal table surface separate from said device housing a further one of said positions, and a connecting cable electrically and fully functionally connecting said operating module and said device housing in all of said positions, said operating keys remaining accessible and said operating module being fully functional in all of said positions, and wherein said front compartment has right and left inner walls, and said module housing has a rear surface with a top, two sides and supporting brackets each being formed on a respective one of said sides at said top of said rear surfaces in ear-like fashion and each having an outer surface, and slide dogs each being disposed on a respective one of said outer surfaces of said supporting brackets, said slide dogs being engaged in retaining slots formed in said right and left inner walls in one of said positions.

2. Data processing device according to claim 1, wherein said front surface is a built-in control panel unit.

3. Data processing device according to claim 1, wherein said connecting cable is a multi-wire ribbon cable.

4. Data processing device according to claim 1, wherein said operating keys are disposed in an operating plane, said front surface is disposed in a front plane, and said suspension configuration in the front compartment and said retaining elements of said operating module position said operating plane in a first position parallel to said front plane and in a second position forming an angle of more than 90 with a portion of said front surface above said operating module.

5. Data processing device according to claim 1, wherein said operating keys are disposed in an operating plane set back behind said front surface when said operating module is in a position parallel to said front surface of said device housing.

6. Data processing device according to claim 5, wherein said front surface is in a front plane, and said operating keys have surfaces projecting substantially into said front plane.

7. Data processing device according to claim 1, wherein said operating module has a rear surface and said front compartment has a base spaced from said rear surface defining an intermediate space large enough to accommodate said connecting cable.

8. Data processing device according to claim 7, wherein said connecting cable is a ribbon cable folded over in several layers.

9. Data processing device according to claim 1, wherein said front compartment has receiving elements formed therein and said module housing has corresponding locating elements cooperating with said receiving elements for locking when said operating module is inserted into said front compartment and for releasing said receiving elements for removal by raising said operating module.

10. Data processing device according to claim 1, wherein said front compartment has upper and lower opposite edges, and including a retaining flange resting on said upper and lower opposite edges and projecting downwards into a depression permitting access to said retaining flange.

11. Data processing device according to claim 10, wherein said front compartment has retaining dogs and has cutouts formed therein, and said module housing has a lower surface with notches formed therein following said retaining flange for receiving said retaining dogs and an upper surface having spring lugs for engagement into said cutouts.

12. Data processing device according to claim 11, wherein said module housing has a rear wall, said cutouts are defined toward said front surface by a locating ridge, said spring lugs extend at said upper surface of said module housing from said rear wall toward said retaining flange and have slightly protruding free ends, and said spring lugs are pressed towards said module housing and said free ends are locked with said locating ridge when said operating module is inserted into said front compartment.

13. Data processing device according to claim 1, including slot guides with front parts and rail-like rear parts defining said retaining slots, said retaining slots having slot entries forming openings towards the top of said retaining slots.

14. Data processing device according to claim 13, wherein said rail-like rear parts project beyond said front parts of said slot guides and said slide dogs rest against said rear parts when said operating module is inserted.

15. Data processing device according to claim 1, wherein said module housing has a rear surface with a lead-through opening formed therein for said connecting cable, and said front compartment has a further opening formed therein for guiding said connecting cable into said device housing.

16. Data processing device according to claim 1, wherein said front surface with said front compartment is formed by a front frame part which encloses said front compartment and an adjacent window behind which a display for displaying data may be disposed.

* * * * *